United States Patent
Kwak et al.

(10) Patent No.: US 9,482,907 B2
(45) Date of Patent: Nov. 1, 2016

(54) LIQUID CRYSTAL DISPLAY

(71) Applicant: Samsung Display Co., Ltd., Yongin, Gyeonggi-Do (KR)

(72) Inventors: Chang Hun Kwak, Suwon-si (KR); Minjung Kang, Incheon (KR); YiSeop Shim, Suwon-si (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 123 days.

(21) Appl. No.: 14/246,974

(22) Filed: Apr. 7, 2014

(65) Prior Publication Data

US 2015/0103296 A1   Apr. 16, 2015

(30) Foreign Application Priority Data

Oct. 14, 2013   (KR) .................. 10-2013-0122113

(51) Int. Cl.
*G02F 1/1335* (2006.01)
*G02F 1/1362* (2006.01)
*G02F 1/1339* (2006.01)
*G02F 1/1343* (2006.01)

(52) U.S. Cl.
CPC ..... *G02F 1/134309* (2013.01); *G02F 1/13394* (2013.01); *G02F 1/133512* (2013.01); *G02F 1/136209* (2013.01); *G02F 2001/136218* (2013.01)

(58) Field of Classification Search
CPC .......... G02F 1/134309; G02F 1/1343; G02F 2001/136218; G02F 1/133512; G02F 1/136209; G02F 1/13394
USPC .................................................. 349/48, 156
See application file for complete search history.

(56) References Cited

U.S. PATENT DOCUMENTS

| 8,390,753 | B2 * | 3/2013 | Choi | G02F 1/136209 349/106 |
| 8,810,745 | B2 * | 8/2014 | Kim | G02F 1/134336 349/48 |
| 8,941,789 | B2 * | 1/2015 | Yoo | G02F 1/13624 349/129 |
| 2005/0243235 | A1 * | 11/2005 | Lee | G02F 1/13394 349/44 |
| 2005/0243263 | A1 * | 11/2005 | Yoon | G02F 1/13394 349/156 |
| 2008/0239187 | A1 * | 10/2008 | Yang | G02F 1/136209 349/44 |
| 2009/0185094 | A1 * | 7/2009 | Lee | G02F 1/13394 349/46 |
| 2010/0127961 | A1 * | 5/2010 | Huh | G02F 1/136227 345/92 |

(Continued)

FOREIGN PATENT DOCUMENTS

| JP | 2004-302448 | 10/2004 |
| JP | 2007-034327 | 2/2007 |

(Continued)

*Primary Examiner* — Paul Lee
*Assistant Examiner* — Jia Pan
(74) *Attorney, Agent, or Firm* — Innovation Counsel LLP

(57) ABSTRACT

A liquid crystal display includes a display substrate, an opposite substrate coupled to and facing the display substrate, and a liquid crystal layer disposed between the display substrate and the opposite substrate. The display substrate includes a gate line extending in a first direction, a data line extending in a second direction crossing the first direction, a shielding electrode disposed along the data line covering the data line, a protruding electrode extending from the shielding electrode partially covering the gate line, and a pixel electrode electrically insulated from the shielding electrode and configured to receive a signal from the gate and data lines.

17 Claims, 15 Drawing Sheets

(56) References Cited

U.S. PATENT DOCUMENTS

| | | | | |
|---|---|---|---|---|
| 2011/0006974 | A1* | 1/2011 | Kim | G02F 1/136213 |
| | | | | 345/90 |
| 2011/0242468 | A1* | 10/2011 | Choi | C08G 8/12 |
| | | | | 349/129 |
| 2011/0292312 | A1 | 12/2011 | Kim et al. | |
| 2012/0038867 | A1* | 2/2012 | Kwon | G02F 1/133512 |
| | | | | 349/110 |
| 2012/0099067 | A1* | 4/2012 | Hara | G02F 1/136277 |
| | | | | 349/139 |

FOREIGN PATENT DOCUMENTS

| | | |
|---|---|---|
| KR | 10-2007-0006485 | 1/2007 |
| KR | 10-2008-0082164 | 9/2008 |
| KR | 10-2012-0110888 | 10/2012 |
| KR | 10-2013-0020281 | 2/2013 |

\* cited by examiner

LIQUID CRYSTAL DISPLAY

CROSS-REFERENCE TO RELATED APPLICATION

This U.S. non-provisional patent application claims priority under 35 U.S.C. §119 to Korean Patent Application No. 10-2013-0122113 filed on Oct. 14, 2013, the contents of which are hereby incorporated by reference in its entirety.

BACKGROUND

1. Field of Disclosure

The present disclosure relates to a flat panel display device. More particularly, the present disclosure relates to a liquid crystal display.

2. Description of the Related Art

A liquid crystal display typically includes two transparent substrates and a liquid crystal layer disposed between the two transparent substrates. The liquid crystal display is configured to align liquid crystal molecules in the liquid crystal layer to control a light transmittance in each pixel, thereby displaying a desired image.

The liquid crystal display may be provided in various alignment modes. For example, in a vertical alignment mode liquid crystal display, the liquid crystal molecules in the liquid crystal layer are vertically aligned with respect to the two substrates when an electric field is formed between the two substrates, and light is transmitted through the vertically aligned liquid crystal molecules to display the image. The vertical alignment mode liquid crystal display includes liquid crystal domains for aligning the liquid crystal molecules in different directions, and thus a viewing angle of the liquid crystal display is improved.

In recent years, a curved liquid crystal display has been developed. The curved liquid crystal display comes with a curved display panel, and can display images having an improved three-dimensional effect, which may provide an immersive viewing experience to the user. However, the curved liquid crystal display may suffer from light leakage due to its curvature.

SUMMARY

The present disclosure is directed to address at least the above issue relating to light leakage in a curved liquid crystal display.

According to some embodiments of the inventive concept, a liquid crystal display is provided. The liquid crystal display includes a display substrate, an opposite substrate coupled to and facing the display substrate, and a liquid crystal layer disposed between the display substrate and the opposite substrate, wherein the display substrate comprises: a gate line extending in a first direction, a data line extending in a second direction crossing the first direction, a shielding electrode disposed along the data line covering the data line, a protruding electrode extending from the shielding electrode partially covering the gate line, and a pixel electrode electrically insulated from the shielding electrode and configured to receive a signal from the gate and data lines.

In some embodiments, the display substrate may include a plurality of pixel areas, and each pixel area may include a light blocking area in which at least one thin film transistor is disposed.

In some embodiments, the protruding electrode may extend to the light blocking area.

In some embodiments, the liquid crystal display may further include a light blocking layer disposed in the light blocking area of the display substrate, wherein the light blocking layer may include a light blocking material.

In some embodiments, the light blocking layer may be spaced apart from the protruding electrode.

In some embodiments, the light blocking layer may overlap with the protruding electrode.

In some embodiments, the liquid crystal display may further include a main spacer disposed on the display substrate and making contact with the opposite substrate to maintain a cell gap between the display substrate and the opposite substrate, wherein the main spacer may include a light blocking material.

In some embodiments, the main spacer may be spaced apart from the light blocking layer.

In some embodiments, the main spacer may be disposed corresponding to the light blocking area in which the thin film transistor is disposed.

In some embodiments, the main spacer may be provided one every three pixels or one every nine pixels.

In some embodiments, the display substrate may include red, green, and blue color pixels respectively corresponding to the pixel areas, and the main spacer may be disposed on the blue color pixel.

In some embodiments, the liquid crystal display may further include a sub-spacer disposed on the display substrate and spaced apart from the opposite substrate, the sub-spacer protruding from the light blocking layer, wherein the sub-spacer may include a light blocking material.

In some embodiments, a difference in height between the main spacer and the sub-spacer may range from about 0.25 micrometers to about 0.8 micrometers.

In some embodiments, the liquid crystal display may further include a sub-spacer disposed on the display substrate and spaced apart from the opposite substrate, and a main spacer disposed on the display substrate and making contact with the opposite substrate to maintain a cell gap between the display substrate and the opposite substrate, wherein the main spacer and the sub-spacer may include a light blocking material.

In some embodiments, a difference in height between the main spacer and the sub-spacer may range from about 0.25 micrometers to about 0.8 micrometers In some embodiments, a ratio of a total contact area between the main spacer and the display substrate to the display area may be about 1% or less.

In some embodiments, the sub-spacer may have a rectangular shape, an oval shape, or a lozenge shape when viewed from a plan view, and the main spacer may have a circular shape, a rectangular shape, or an oval shape when viewed from a plan view.

In some embodiments, each pixel area may include a first sub-pixel area and a second sub-pixel area, the display substrate may include a first sub-pixel electrode disposed in the first sub-pixel area and a second sub-pixel electrode disposed in the second sub-pixel area, and the thin film transistor may include a first thin film transistor connected to the first sub-pixel electrode and a second thin film transistor connected to the second sub-pixel electrode In some embodiments, the data line may include a first data line electrically connected to the first sub-pixel electrode to apply a first data signal to the first sub-pixel electrode, a second data line electrically connected to the second sub-pixel electrode to apply a second data signal to the second sub-pixel electrode, wherein the second data signal may be different from the first data signal, and the shielding electrode may extend along the first and second data lines to receive a black gray scale voltage.

In some embodiments, the protruding electrode may extend in an area between the first and second sub-pixel areas.

BRIEF DESCRIPTION OF THE DRAWINGS

The above and other advantages of the inventive concept will be apparent with reference to the following detailed description in conjunction with the accompanying drawings.

DETAILED DESCRIPTION

Figure 1:
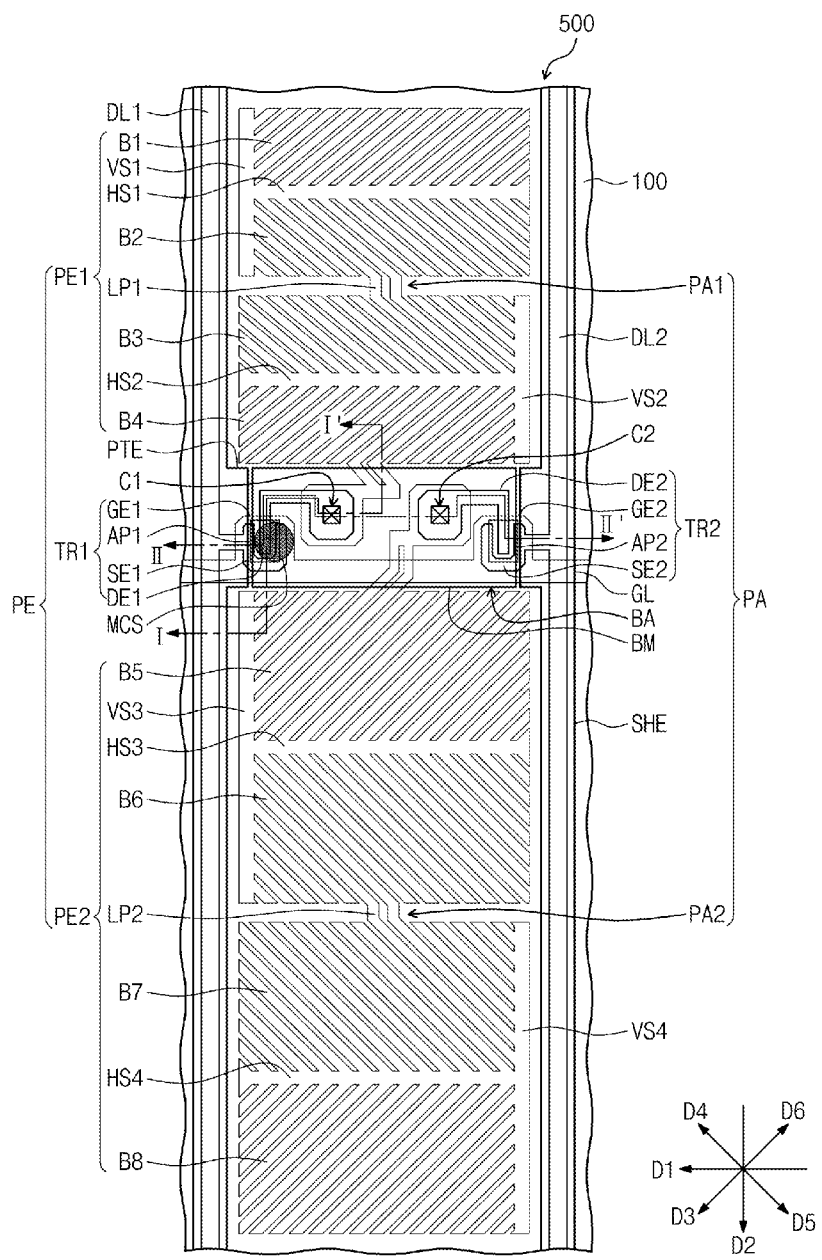
FIG. 1 is a plan view of a liquid crystal display according to an exemplary embodiment of the inventive concept.

It will be understood that when an element or layer is referred to as being "on", "connected to", or "coupled to" another element or layer, it can be directly on, connected, or coupled to the other element or layer, or with one or more intervening elements or layers being present. In contrast, when an element is referred to as being "directly on", "directly connected to", or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers, and/or sections, the elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the inventive concept.

Spatially relative terms, such as "beneath", "below", "lower", "above", "upper", and the like, may be used herein for ease of description to describe one element or feature's spatial relationship to another element(s) or feature(s) as illustrated in the figures. It will be understood that the spatially relative terms are intended to encompass different orientations of the device while in use or during operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to limit the inventive concept. As used herein, the singular forms, "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The inventive concept is herein described in detail with reference to the accompanying drawings.

Figure 2A:
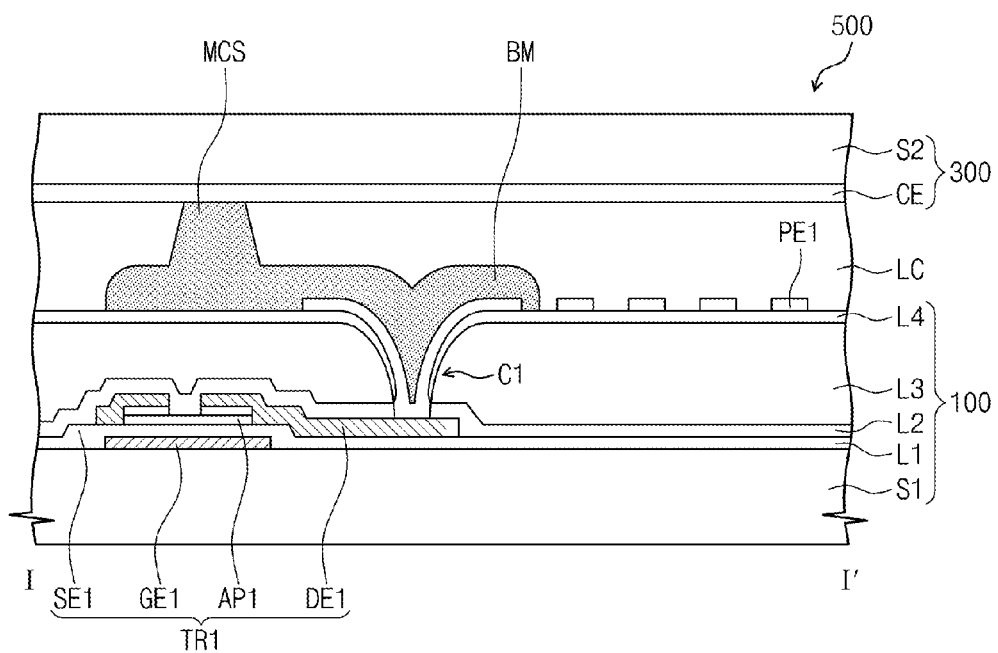
FIG. 2A is a cross-sectional view of the liquid crystal display of FIG. 1 taken along line I-I'.
Figure 2B:
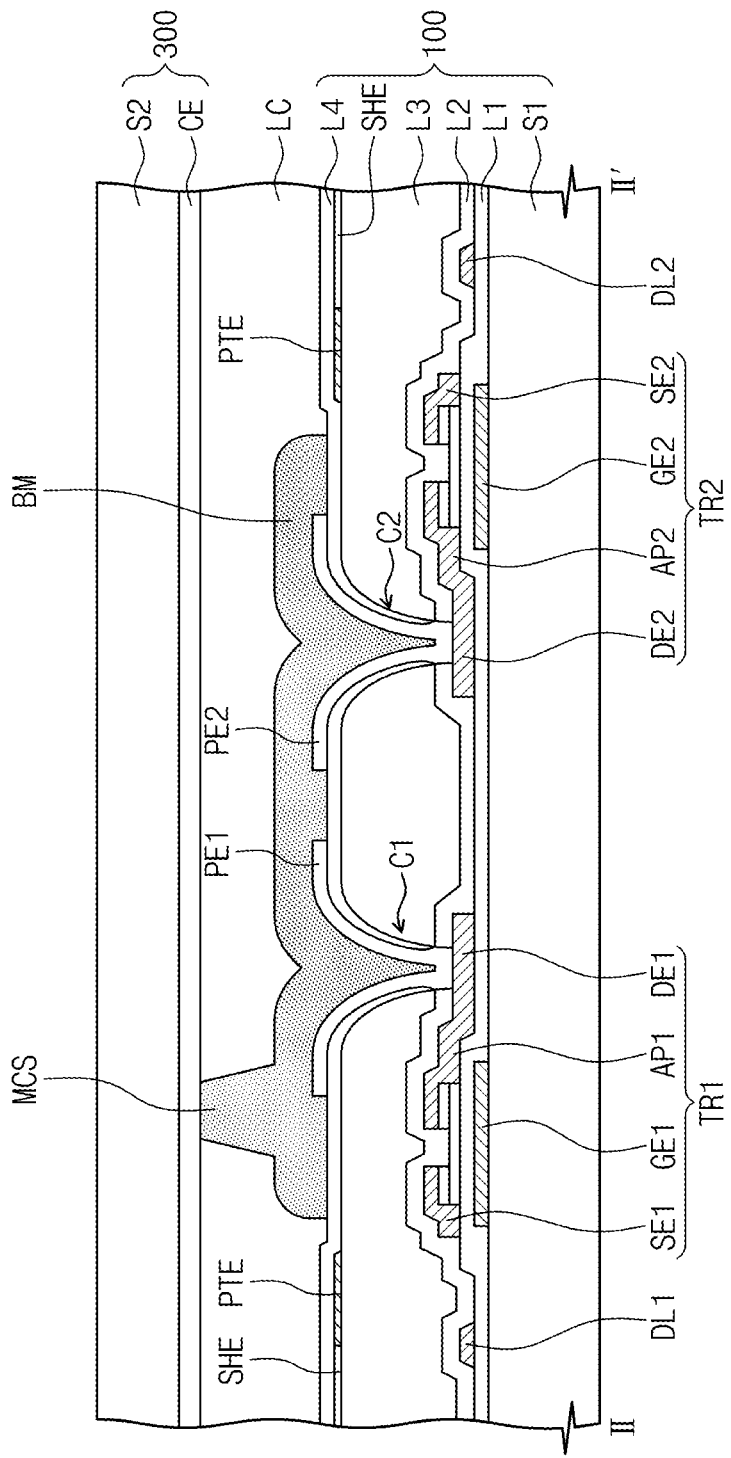
FIG. 2B is a cross-sectional view of the liquid crystal display of FIG. 1 taken along line II-II'.

FIG. 1 is a plan view of a liquid crystal display according to an exemplary embodiment of the inventive concept. FIG. 2A is a cross-sectional view of the liquid crystal display of FIG. 1 taken along line I-I'. FIG. 2B is a cross-sectional view of the liquid crystal display of FIG. 1 taken along line II-II'.

The liquid crystal display includes a plurality of pixels. In the interest of clarity, only one pixel area PA (in which one pixel is disposed) of the liquid crystal display is illustrated in FIG. 1. Referring to FIGS. 1, 2A, and 2B, a liquid crystal display 500 includes a display substrate 100, an opposite substrate 300, and a liquid crystal layer LC. The opposite substrate 300 is coupled to the display substrate 100 and disposed facing the display substrate 100. The liquid crystal layer LC is interposed between the display substrate 100 and the opposite substrate 300.

The liquid crystal display 500 may include other components in addition to the display substrate 100 and the opposite substrate 300. For instance, the liquid crystal display 500 may further include a backlight assembly (not shown) for providing light to the display substrate 100 and the opposite substrate 300.

The display substrate 100 includes a first base substrate S1, a gate line GL, a first data line DL1, a second data line DL2, a first thin film transistor TR1, a second thin film transistor TR2, shielding electrodes SHE, a protruding electrode PTE, a pixel electrode PE, a light blocking layer BM, and a main spacer MCS.

The first base substrate S1 may be an insulating substrate having light transmitting and flexible properties (e.g., a plastic substrate). The gate line GL is disposed on the first base substrate S1 and extends in a first direction D1. The gate line GL is electrically connected to the first and second thin film transistors TR1 and TR2 to transmit a gate signal to the first and second thin film transistors TR1 and TR2.

The pixel electrode PE is disposed in the pixel area PA. The pixel area PA includes a first sub-pixel area PA1 and a second sub-pixel area PA2. Accordingly, the pixel electrode PE includes a first sub-pixel electrode PE1 disposed in the first sub-pixel area PA1 and a second sub-pixel electrode PE2 disposed in the second sub-pixel area PA2.

The first and second data lines DL1 and DL2 are disposed on the first base substrate S1 and insulated from the gate line GL. The first and second data lines DL1 and DL2 extend in a second direction D2 substantially perpendicular to the first direction D1. The first data line DL1 applies a first data signal to the first thin film transistor TR1 and the second data line DL2 applies a second data signal to the second thin film transistor TR2. The first data line DL1 extends along one side of the first and second sub-pixel electrodes PE1 and PE2, and the second data line DL2 extends along the other side of the first and second sub-pixel electrodes PE1 and PE2. Accordingly, the first and second sub-pixel electrodes PE1 and PE2 may be disposed between the first and second data lines DL1 and DL2.

The first thin film transistor TR1 is electrically connected to the gate line GL, the first data line DL1, and the first sub-pixel PE1. Therefore, when the first thin film transistor TR1 is turned on in response to the gate signal, the first data signal is applied to the first sub-pixel electrode PE1.

The first thin film transistor TR1 includes a first gate electrode GE1, a first active pattern AP1, a first source electrode SE1, and a first drain electrode DE1. The first gate electrode GE1 branches from the gate line GL, and the first active pattern AP1 is disposed on the first gate electrode GE1. A first insulating layer L1 is disposed between the first active pattern AP1 and the first gate electrode GE1. The first source electrode SE1 branches from the first data line DL1 to make contact with the first active pattern AP1, and the first drain electrode DE1 is spaced apart from the first source electrode SE1 to make contact with the first active pattern AP1.

The second thin film transistor TR2 is electrically connected to the gate line GL, the second data line DL2, and the second sub-pixel electrode PE2. When the second thin film transistor TR2 is turned on by the gate signal, the second data signal is applied to the second sub-pixel electrode PE2.

The second thin film transistor TR2 includes a second gate electrode GE2, a second active pattern AP2, a second source electrode SE2, and a second drain electrode DE2. The second gate electrode GE2 branches from the gate line GL, and the second active pattern AP2 is disposed on the second gate electrode GE2. The first insulating layer L1 is disposed between the second active pattern AP2 and the second gate electrode GE2. The second source electrode SE2 branches from the second data line DL2 to make contact with the second active pattern AP2, and the second drain electrode DE2 is spaced apart from the second source electrode SE2 to make contact with the second active pattern AP2.

Each of the first and second active patterns AP1 and AP2 may include a semiconductor material (such as amorphous silicon, crystalline silicon, etc.) but is not limited thereto. In some other embodiments, each of the first and second active patterns AP1 and AP2 may include an oxide semiconductor (e.g., IGZO, ZnO, $SnO_2$, $In_2O_3$, $Zn_2SnO_4$, $Ge_2O_3$, or $HfO_2$), or a compound semiconductor (e.g., GaAs, GaP, or InP).

A second insulating layer L2 is disposed covering the first and second thin film transistors TR1 and TR2, and a third insulating layer L3 is disposed on the second insulating layer L2. The second insulating layer L2 includes an inorganic insulating material and the third insulating layer L3 includes an organic insulating material. As an example, the third insulating layer L3 may be a color filter layer including red, green, and blue color pixels.

Each shielding electrode SHE extends in the second direction D2, is formed along each of the first and second data lines DL1 and DL2, and is arranged in the first direction D1 spaced apart from each other by a predetermined distance. Each shielding electrode SHE has a width greater than a width of each of the first and second data lines DL1 and DL2. Accordingly, each shielding electrode SHE is disposed covering the first data line DL1 or the second data line DL2 when viewed from a plan view.

The protruding electrode PTE protrudes from each shielding electrode SHE and is disposed substantially parallel to the gate line GL. In some embodiments, the protruding electrode PTE may be integrated with a corresponding shielding electrode of the shielding electrodes SHE.

As shown in FIG. 2B, the shielding electrodes SHE and the protruding electrode PTE are disposed on the third insulating layer L3. The shielding electrodes SHE and the protruding electrode PTE receive a voltage corresponding to a black gray scale.

The shielding electrodes SHE and the protruding electrode PTE are covered by a fourth insulating layer L4, and the first and second sub-pixel electrodes PE1 and PE2 are disposed on the fourth insulating layer L4. The first and second sub-pixel electrodes PE1 and PE2 may include a transparent conductive oxide. The shielding electrodes SHE and the protruding electrode PTE are electrically insulated from the first and second sub-pixel electrodes PE1 and PE2 by the fourth insulating layer L4. As an example, the shielding electrodes SHE and the protruding electrode PTE may include the same transparent conductive oxide as the first and second sub-pixel electrodes PE1 and PE2.

The first sub-pixel electrode PE1 makes contact with the first drain electrode DE1 via a first contact hole C1 formed through the second, third, and fourth insulating layers L2, L3, and L4. The second sub-pixel electrode PE2 makes contact with the second drain electrode DE2 via a second contact hole C2 formed through the second, third, and fourth insulating layers L2, L3, and L4.

As described above, the first and second sub-pixel electrodes PE1 and PE2 are driven by different data signals, such that the first and second sub-pixel areas PA1 and PA2 display different gray scales.

Although not shown in the figures, a first alignment layer may be disposed above the first and second sub-pixel electrodes PE1 and PE2. When no electric field is formed between the display substrate 100 and the opposite substrate 300, the first alignment layer aligns the liquid crystal molecules in the liquid crystal layer LC such that the liquid crystal molecules are inclined with respect to the first alignment layer. When an electric field is applied, the liquid crystal molecules become more inclined with respect to the first alignment layer, such that the liquid crystal molecules will be aligned in a direction substantially parallel to the display substrate 100. The aforementioned orientation of the liquid crystal molecules due to the electric field is referred to as a super vertical alignment (SVA) mode. The SVA mode may improve a response speed required to display the image in the liquid crystal display 500.

A light blocking area BA is defined between the first and second sub-pixel areas PA1 and PA2. The first and second thin film transistors TR1 and TR2 and the first and second contact holes C1 and C2 are disposed in the light blocking area BA.

The light blocking layer BM is formed of an organic material including a light blocking material (e.g., carbon black), and is disposed in the light blocking area BA of the display substrate 100. In particular, the light blocking layer BM may be disposed on the fourth insulating layer L4. In embodiments where the display substrate 100 further includes the first alignment layer, the first alignment layer may be disposed on the light blocking layer BM, the fourth insulating layer L4, and the pixel electrode PE.

Since the light blocking layer BM has a light blocking property due to the light blocking material, the light blocking layer BM may block light. Particularly, when the liquid crystal display 500 includes the backlight assembly disposed at a rear of the display substrate 100, the light blocking layer BM may block the light provided from the backlight assembly.

The protruding electrode PTE extends toward the light blocking area BA. The light blocking layer BM may be spaced apart from the protruding PTE by a predetermined distance.

The main spacer MCS is formed of an organic material including a light blocking material (e.g., carbon black), and has a column shape protruding from the light blocking layer BM to the opposite substrate 300.

As shown in FIGS. 2A and 2B, the main spacer MCS makes contact with the opposite substrate 300 to maintain a cell gap between the display substrate 100 and the opposite substrate 300.

As a result of the main spacer MCS, sufficient space may be provided between the display substrate 100 and the opposite substrate 300 to accommodate the liquid crystal layer LC.

As an example, the main spacer MCS is disposed in a portion of the light blocking area BA corresponding to the first thin film transistor TR1. Since the number of layers that are stacked in the areas in which the first and second thin film transistors TR1 and TR2 are formed is greater than the number of layers in other areas, the areas (in which the first and second thin film transistors TR1 and TR2 are formed) may protrude to the opposite substrate 300. Therefore, when a main spacer MCS having a relatively thick thickness (compared to a thickness of the light blocking layer BM) is formed on the area in which the first thin film transistor TR1 or the second thin film transistor TR2 is formed, a manufacturing process time required to form the main spacer MCS at a desired thickness may be shortened.

Referring to FIGS. 2A and 2B, the opposite substrate 300 includes a second base substrate S2 and a common electrode CE. The second base substrate S2 may be an insulating substrate having light transmitting and flexible properties.

The electric field is formed between the common electrode CE and the pixel electrode PE, and applied to the liquid crystal layer LC disposed therebetween. The liquid crystal molecules in the liquid crystal layer LC align in accordance with the electric field formed between the pixel electrode PE and the common electrode CE. The common electrode CE receives a common voltage, and the first and second sub-pixel electrodes PE1 and PE2 respectively receive the first and second data voltages from the first and second data lines DL1 and DL2. Thus, the electric field is formed having an intensity corresponding to an electric potential difference between the common voltage and the first and second data voltages. The alignment of the liquid crystal molecules in the liquid crystal layer LC changes in accordance with the intensity of the electric field, thereby controlling a light transmittance of the liquid crystal layer LC.

The light provided to the liquid crystal layer LC may include the light provided from the backlight assembly (not shown) disposed at the rear of the display substrate 100.

The shielding electrodes SHE and the protruding electrode PTE are applied with the voltage corresponding to the black gray scale. For instance, a voltage having the same electric potential as the common voltage applied to the common electrode CE may be applied to the shielding electrodes SHE and the protruding electrode PTE. Thus, the electric field is not formed between the common electrode CE and the shielding electrodes SHE and between the common electrode CE and the protruding electrode PTE. If the liquid crystal molecules in the liquid crystal layer LC are negative type liquid crystal molecules, the liquid crystal molecules will be vertically aligned against the surface of the shielding electrodes SHE and the protruding electrode PTE in the absence of an electric field.

As described above, when the liquid crystal molecules are vertically aligned, the light provided from the backlight assembly may be blocked by the vertically aligned liquid crystal molecules. Accordingly, the area in which the shielding electrodes SHE and the protruding electrode PTE are formed may serve as the light blocking area to block the light provided from the backlight assembly.

Figure 3A:
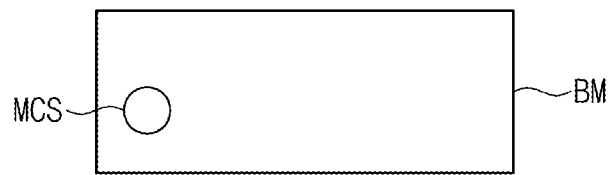
FIGS. 3A to 3C are plan views of a light blocking layer and a main spacer according to an exemplary embodiment of the inventive concept.
Figure 3B:
Figure 3C:
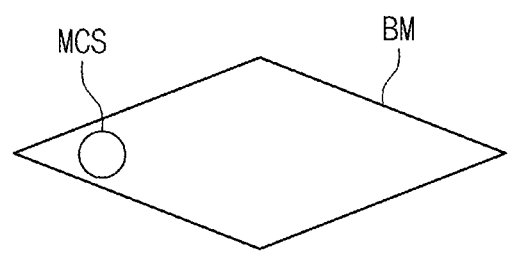

FIGS. 3A to 3C are plan views of a light blocking layer and a main spacer according to an exemplary embodiment of the inventive concept.

Referring to FIGS. 3A to 3C, the light blocking layer BM has a rectangular shape, an oval shape, or a lozenge shape when viewed from a plan view. Since the light blocking layer BM is formed in a region corresponding to the light blocking area BA of the display substrate 100, the shape of the light blocking layer BM may vary depending on the shape of the light blocking area BA.

As shown in FIGS. 3A to 3C, the main spacer MCS has a circular shape when viewed from a plan view. However, the shape of the main spacer MCS need not be limited to a circular shape and may include other shapes.

Figure 4A:
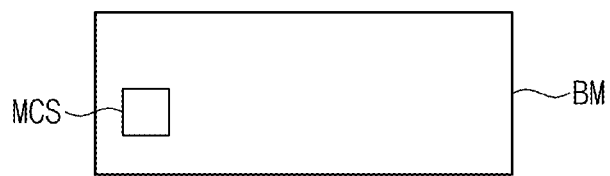
FIGS. 4A to 4C are plan views of a light blocking layer and a main spacer according to another exemplary embodiment of the inventive concept.
Figure 4B:
Figure 4C:
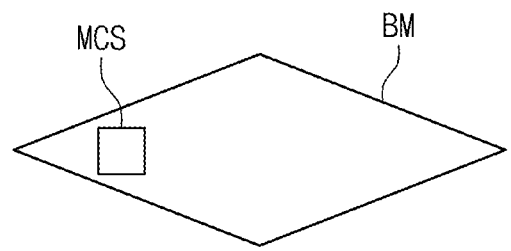

FIGS. 4A to 4C are plan views of a light blocking layer and a main spacer according to another exemplary embodiment of the inventive concept.

As shown in FIGS. 4A to 4C, the main spacer MCS may have a rectangular shape when viewed from a plan view. However, the shape of the main spacer MCS need not be limited to a rectangular shape and may include other shapes.

Figure 5:
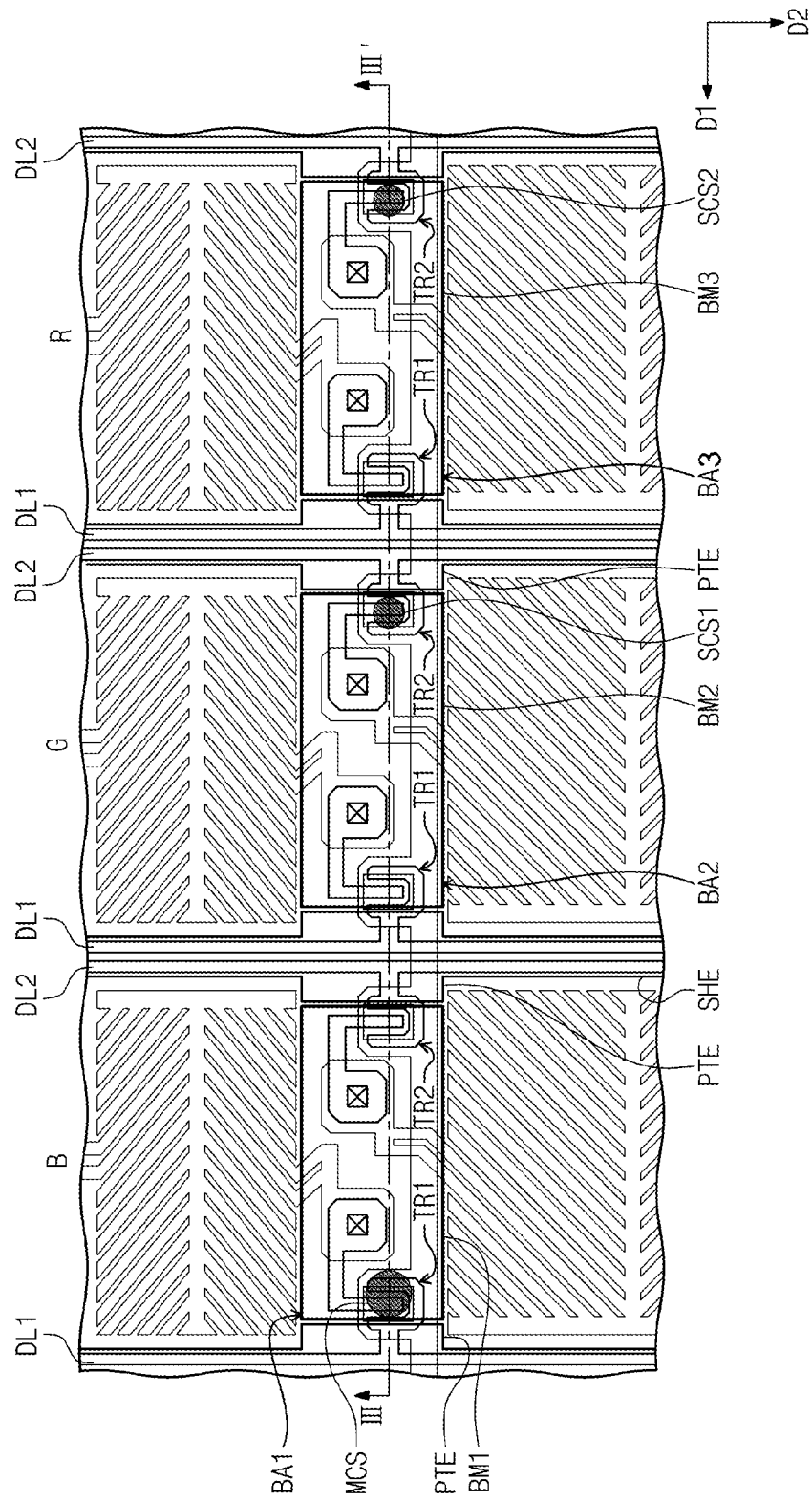
FIG. 5 is a plan view showing pixels arranged in one row by three columns according to another exemplary embodiment of the inventive concept.
Figure 6:
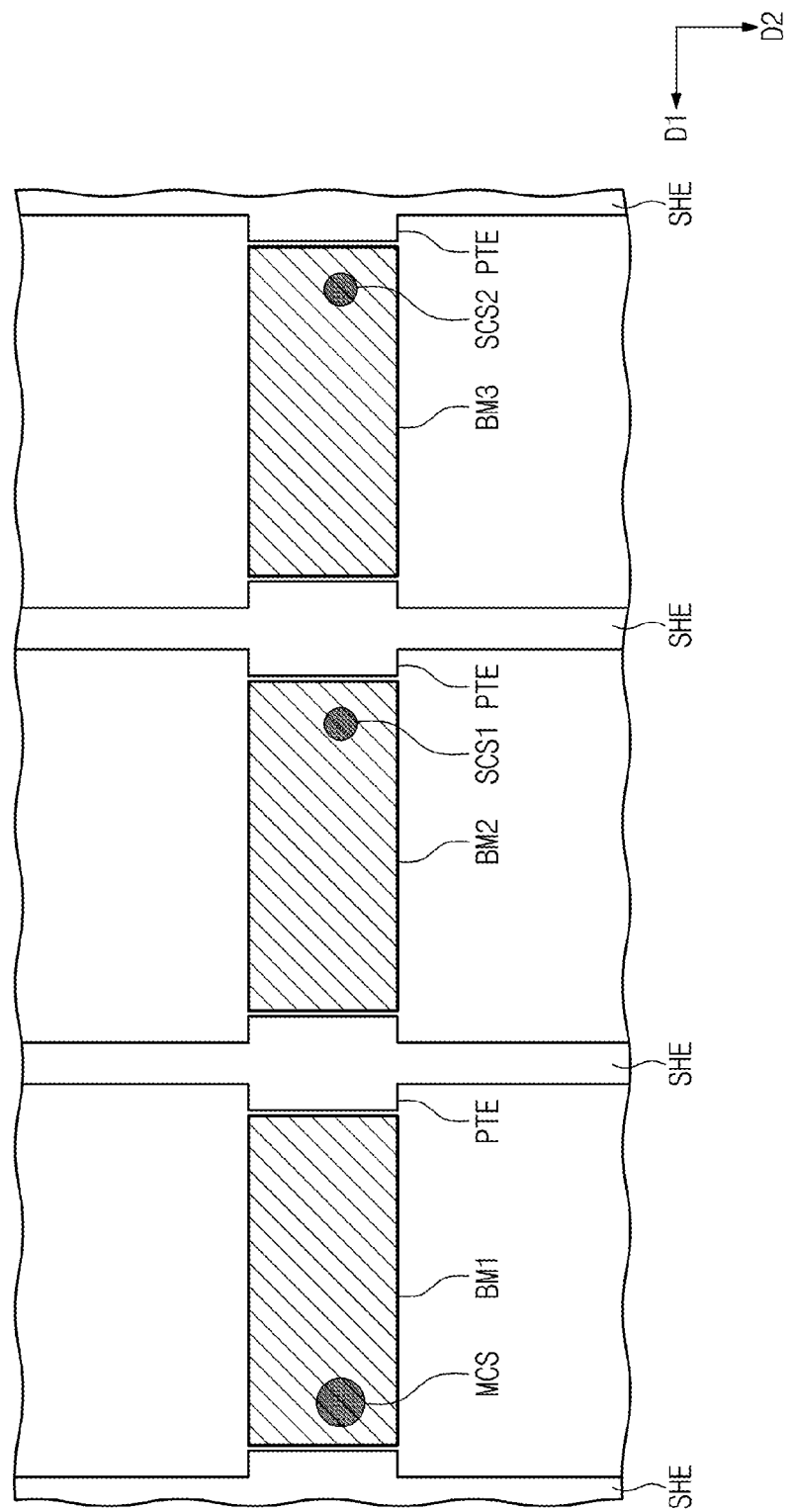
FIG. 6 is a plan view showing a spatial relation between the shielding electrode, the protruding electrode, and the light blocking layer of FIG. 5.
Figure 7:
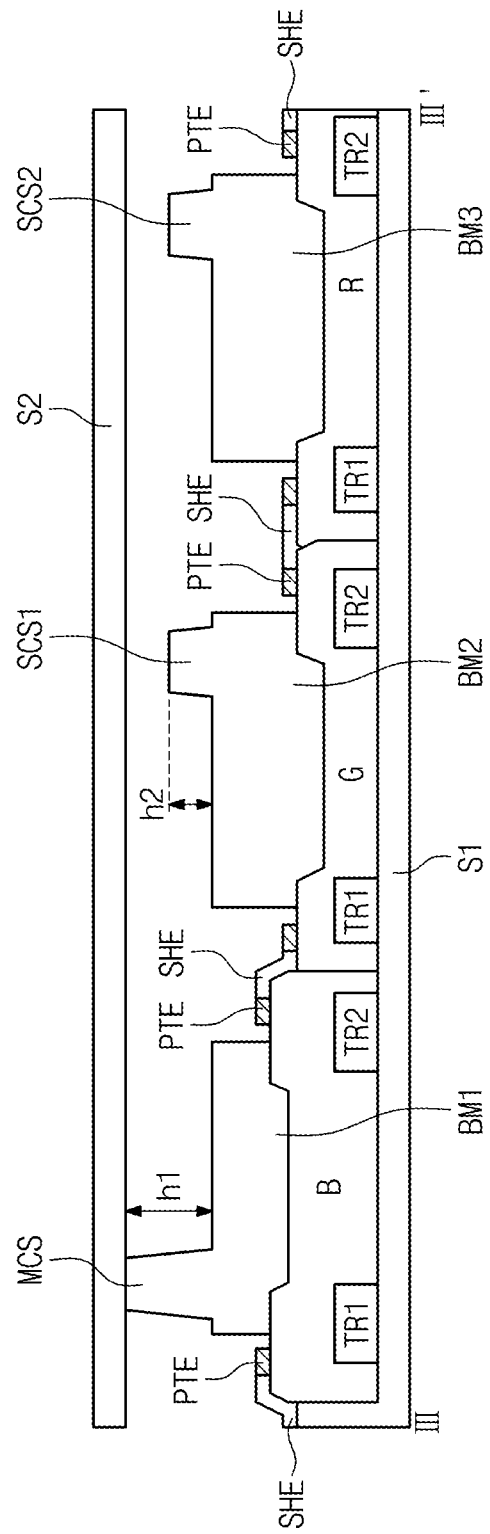
FIG. 7 is a cross-sectional view of the pixels of FIG. 5 taken along line III-III'.

FIG. 5 is a plan view showing pixels arranged in one row by three columns according to another exemplary embodiment of the inventive concept. FIG. 6 is a plan view showing a spatial relation between the shielding electrode, the protruding electrode, and the light blocking layer of FIG. 5. FIG. 7 is a cross-sectional view of the pixels of FIG. 5 taken along line III-III'.

FIGS. 5 and 7 show pixels arranged in one row by three columns. Specifically, FIG. 5 depicts first, second, and third light blocking areas BA1, BA2, and BA3 respectively corresponding to the pixels arranged in one row by three columns.

With reference to FIG. 7, in the interest of clarity, layers disposed between the first base substrate S1 and the color pixel have been omitted, as well as the layers disposed on the second base substrate S2 of the opposite substrate 300.

Referring to FIG. 5, blue, green, and red color pixels B, G, and R are sequentially arranged in the pixels arranged in one row by three columns along the row direction. Although not shown in the figures, the color pixels having the same color are arranged in the same column.

In addition, the first and second transistors TR1 and TR2 are disposed in each of the first, second, and third light blocking areas BA1, BA2, and BA3. However, the number of the thin film transistors disposed in each of the first to third light blocking areas BA1 to BA3 may change by the application method of the data signals having different levels are applied to the first and second sub-pixel electrodes PE1 and PE2. Accordingly, those skilled in the art would recognize that any number of transistors (e.g., one transistor, or three or more thin film transistors) may be disposed in each of the first to third light blocking areas BA1 to BA3.

In some embodiments, the display substrate 100 includes first, second, and third light blocking layers BM1, BM2, and BM3, a main spacer MCS, and first and second sub-spacers SCS1 and SCS2.

The first to third light blocking layers BM1 to BM3 are disposed in the first to third light blocking areas BA1 to BA3, respectively. The main spacer MCS is disposed in the first light blocking area BA1 in which the blue color pixel B is disposed, and the first and second sub-spacers SCS1 and SCS2 are disposed in the second and third light blocking areas BA2 and BA3, respectively.

The main spacer MCS protrudes from the first light blocking layer BM1 to the opposite substrate 300, and the first and second sub-spacers SCS1 and SCS2 respectively protrude from the second and third light blocking layers BM2 and BM3 to the opposite substrate 300.

The main spacer MCS has a first height h1, and each of the first and second sub-spacers SCS1 and SCS2 has a second height h2 that is less than the first height h1. Accordingly, an upper surface of the main spacer MCS makes contact with the opposite substrate 300, but upper surfaces of the first and second sub-spacers SCS1 and SCS2 may be spaced apart from the opposite substrate 300 by a predetermined distance.

As an example, the blue color pixel B has a thickness greater than a thickness of each of the green and red color pixels G and R. In this case, a difference in thickness between the blue color pixel B and the green and red color pixels G and R may be about 0.2 micrometers.

Particularly, when the main spacer MCS is formed on the blue color pixel B, a process time required to form the main spacer MCS on the display substrate 100 may be shortened and the process of forming the main spacer MCS may be more easily performed.

If the thickness of the blue color pixel B is substantially equal to a thickness of each of the green and red color pixels G and R, a position of the main spacer MCS need not be limited to the area corresponding to the blue color pixel B. That is, the main spacer MCS may be formed in the areas in which the green and red color pixels G and R are disposed.

As shown in FIG. 5, the main spacer MCS is provided one every three pixels. An area ratio of the main spacer MCS to the display area of the liquid crystal display 500 may be about 1% or less. The area ratio indicates a ratio of a total contact area between the main spacer MCS and the display substrate 100 to the display area DA (shown in FIG. 9) of the liquid crystal display 500.

The first to third light blocking layers BM1 to BM3 are arranged in the first direction D1 (shown in FIG. 1) and spaced apart from each other by a predetermined distance. The shielding electrode SHE is disposed between the first and second light blocking layers BM1 and BM2 and between the second and third light blocking layers BM2 and BM3. The shielding electrode SHE extends along the first and second data lines DL1 and DL2 in a second direction D2 substantially perpendicular to the first direction D1.

The protruding electrode PTE is disposed between the shielding electrode SHE and the first to third light blocking layers BM1 to BM3. The protruding electrode PTE extends from the shielding electrode SHE in a direction substantially parallel to the gate line GL.

In some embodiments, the shielding electrode SHE is integrated with the protruding electrode PTE, and the protruding electrode PTE is spaced apart from an adjacent light blocking layer of the first to third light blocking layers BM1 to BM3.

As described above, when the protruding electrode PTE protruding from the shielding electrode SHE extends to the adjacent light blocking layer of the first to third light blocking layers BA1 to BA3, the width of each of the first to third light blocking layers BM1 to BM3 disposed in a corresponding light blocking area of the first to third light blocking areas BA1 to BA3 may be reduced. In addition, since the areas (in which the first to third light blocking layers BM1 to BM3 are disposed) are reduced, a defect (e.g., elution) caused by a material used to form the first to third light blocking layers BM1 to BM3 is reduced. As a result of the defect reduction, deterioration in the process reliability may be prevented.

Figure 8:
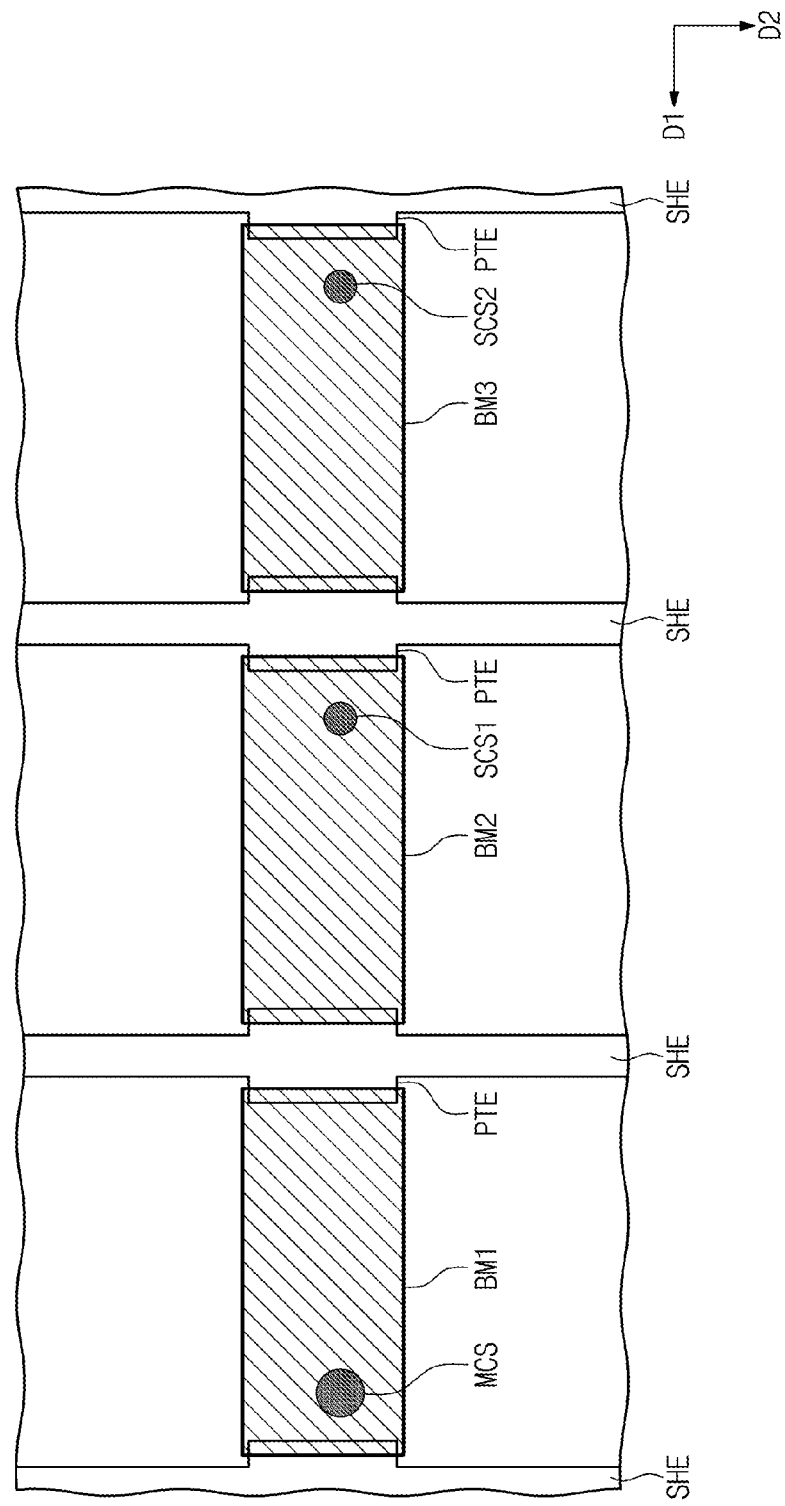
FIG. 8 is a plan view showing a spatial relation between a shielding electrode, a protruding electrode, and a light blocking layer according to another exemplary embodiment of the inventive concept.

FIG. 8 is a plan view showing a spatial relation between a shielding electrode, a protruding electrode, and a light blocking layer according to another exemplary embodiment of the inventive concept.

Referring to FIG. 8, the protruding electrode PTE may be disposed overlapping with the adjacent light blocking layer of the first to third light blocking layer BM1 to BM3.

In this case, light leakage may be prevented from occurring between the protruding electrode PTE and the adjacent light blocking layer of the first to third light blocking layers BM1 to BM3.

Figure 9:
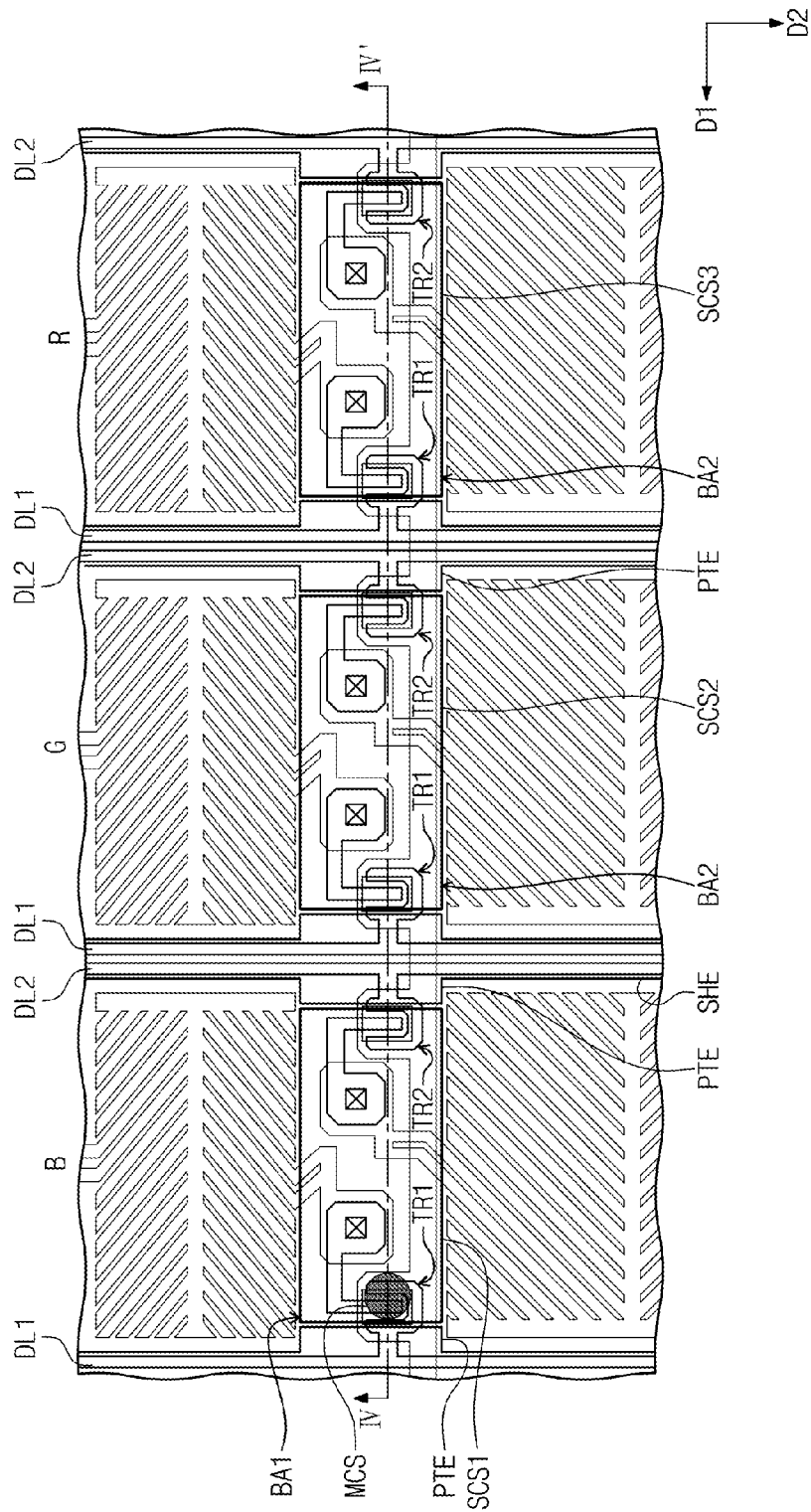
FIG. 9 is a plan view showing pixels arranged in one row by three columns according to another exemplary embodiment of the inventive concept.
Figure 10:
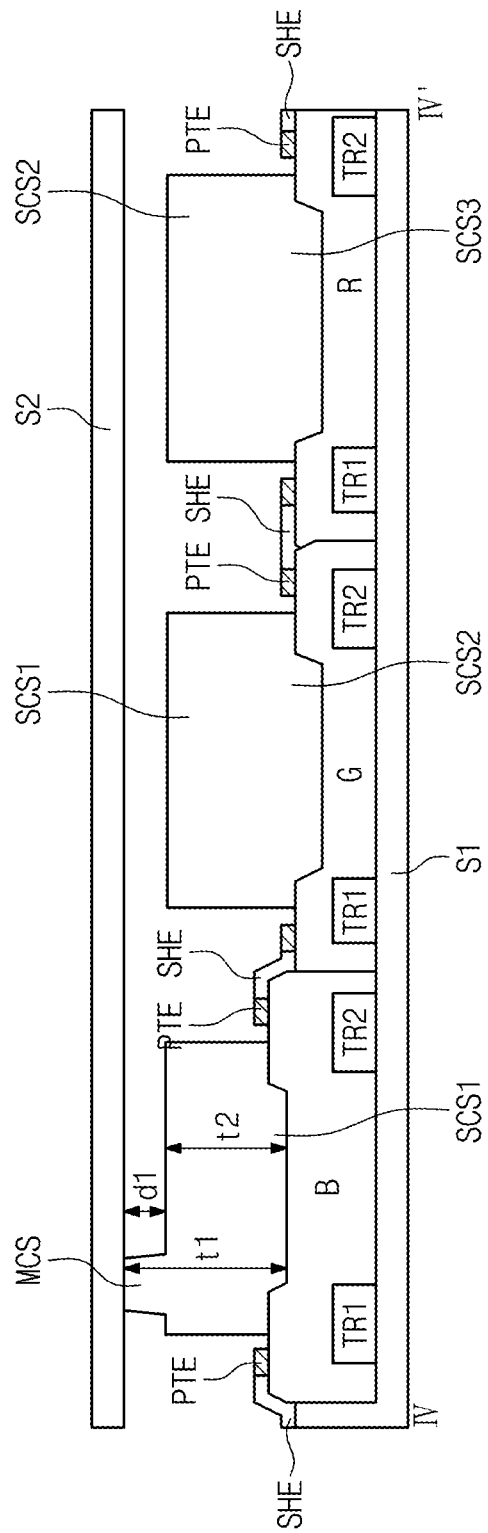
FIG. 10 is a cross-sectional view of the pixels of FIG. 9 taken along line IV-IV'.

FIG. 9 is a plan view showing pixels arranged in one row by three columns according to another exemplary embodiment of the inventive concept. FIG. 10 is a cross-sectional view of the pixels of FIG. 9 taken along line IV-IV'. In FIGS. 9 and 10, the same reference numerals denote the same elements as in FIG. 7, and thus detailed descriptions of the same elements will be omitted.

Referring to FIGS. 9 and 10, blue, green, and red color pixels B, G, and R are sequentially arranged in the pixels arranged in one row by three columns along the row direction. Although not shown in the figures, the color pixels having the same color are arranged in the same column.

The first, second, and third light blocking areas BA1, BA2, and BA3 respectively corresponding to the pixels arranged in one row by three columns are formed. The first, second, and third sub-spacers SCS1, SCS2, and SCS3 are disposed in the first, second, and third light blocking areas BA1, BA2, and BA3, respectively. The main spacer MCS is disposed in the first light blocking area BA1 in which the blue color pixel B is disposed, but is not disposed in the second and third light blocking areas BA2 and BA3.

As an example, the blue color pixel B has a thickness thicker than a thickness of each of the green and red color pixels G and R. In this case, a difference in thickness between the blue color pixel B and the green and red color pixels G and R may be about 0.2 micrometers.

Particularly, when the main spacer MCS is formed on the blue color pixel B, a process time required to form the main spacer MCS on the display substrate 100 may be shortened and the process of forming the main spacer MCS may be more easily performed.

The main spacer MCS and the first to third sub-spacers SCS1 to SCS3 are formed of an organic material including a light blocking material (e.g., carbon black), and thus the main spacer MCS and the first to third sub-spacers SCS1 to SCS3 may block light.

The first to third sub-spacers SCS1 to SCS3 have a size corresponding to the size of the first to third light blocking areas BA1 to BA3, respectively. The main spacer MCS protrudes from the first sub-spacer SCS1 to the opposite substrate 300.

As shown in FIG. 10, the main spacer MCS makes contact with the opposite substrate 300 to maintain a cell gap between the display substrate 100 and the opposite substrate 300 when no external force is applied to the liquid crystal display 500. The first to third sub-spacers SCS1 to SCS3 are spaced apart from the opposite substrate 300, and thus the first to third sub-spacers SCS1 to SCS3 do not make contact with the opposite substrate 300. In some embodiments, a difference in height between the main spacer MCS and each of the first to third sub-spacers SCS1 to SCS3 may range from about 0.25 micrometers to about 0.8 micrometers. For instance, when the main spacer MCS has a thickness t1 of about 3 micrometers, the first to third sub-spacers SCS1 to SCS3 may each have a thickness t2 of about 2.5 micrometers.

The main spacer MCS and the first to third sub-spacers SCS1 to SCS3 include an elastic material. Accordingly, when the external force is applied to the liquid crystal display 500, the height of the main spacer MCS is reduced and a reference cell gap between the display substrate 100 and the opposite substrate 300 is temporarily reduced. When the external force is removed, the distance between the display substrate 100 and the opposite substrate 300 is restored to the reference cell gap by a restoring force of the main spacer MCS.

However, if the external force applied to the liquid crystal display 500 is greater than the elastic force of the main spacer MCS, the distance between the display substrate 100 and the opposite substrate 300 may not be restored to the reference cell gap. As a result, the cell gap of the liquid crystal display 500 may not be uniformly maintained at the reference cell gap. Nevertheless, the first to third sub-spacers SCS1 to SCS3 serve as a buffer against the external force applied to the main spacer MCS, thus preventing the elasticity of the main spacer MCS from being lowered by the external force.

As shown in FIG. 9, the main spacer MCS is provided one every three pixels. An area ratio of the main spacer MCS to the display area of the liquid crystal display 500 may be about 1% or less. The area ratio indicates a ratio of a total contact area between the main spacer MCS and the display substrate 100 to the display area DA of the liquid crystal display 500.

The first to third sub-spacers SCS1 to SCS3 are arranged in the first direction D1 and spaced apart from each other by a predetermined distance. The shielding electrode SHE is disposed between the first and second sub-spacers SCS1 and SCS2 and between the second and third sub-spacers SCS2 and SCS3. The shielding electrode SHE extends along the first and second data lines DL1 and DL2 in a second direction D2 substantially perpendicular to the first direction D1.

The protruding electrode PTE is disposed between the shielding electrode SHE and an adjacent sub-spacer of the first to third sub-spacers SCS1 to SCS3. The protruding electrode PTE extends from the shielding electrode SHE in a direction substantially parallel to the gate line GL.

In some embodiments, the shielding electrode SHE is integrated with the protruding electrode PTE, and the protruding electrode PTE is spaced apart from adjacent sub-spacers of the first to third sub-spacers SCS1 to SCS3.

As described above, when the protruding electrode PTE protruding from the shielding electrode SHE extends to the adjacent sub-spacer of the first to third light blocking areas BA1 to BA3, the width of each of the first to third sub-spacers SCS1 to SCS3 disposed in a corresponding light blocking area of the first to third light blocking areas BA1 to BA3 may be reduced. In addition, since the areas (in which the first to third sub-spacers SCS1 to SCS3 are disposed) are reduced, a defect (e.g., elution) caused by a material used to form the first to third light blocking layers BM1 to BM3 is reduced. As a result of the defect reduction, deterioration in the process reliability may be prevented.

Figure 11A:
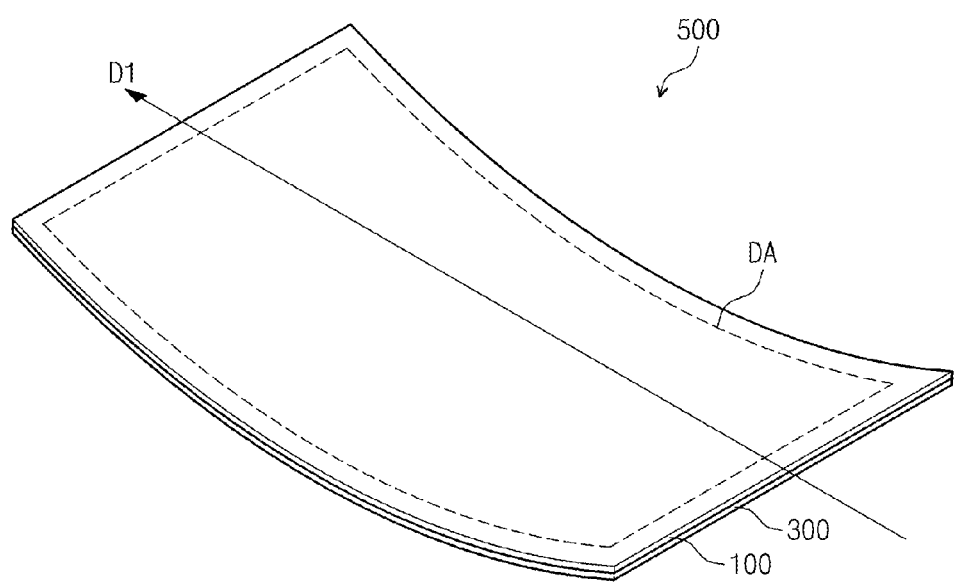
FIG. 11A is a perspective view of a liquid crystal display according to an exemplary embodiment of the inventive concept.
Figure 11B:
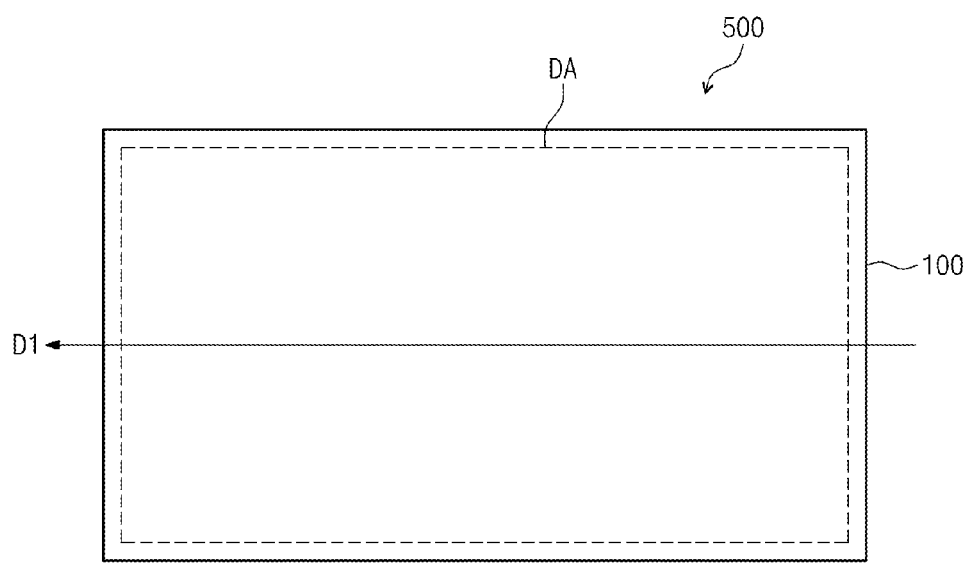
FIG. 11B is a plan view of the liquid crystal display shown in FIG. 11A.
Figure 11C:
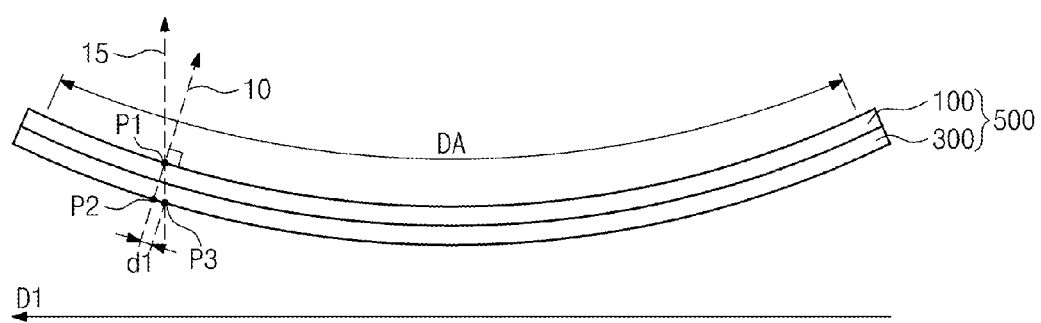
FIG. 11C is a side view of the liquid crystal display shown in FIG. 11A.

FIG. 11A is a perspective view of a liquid crystal display according to an exemplary embodiment of the inventive concept. FIG. 11B is a plan view of the liquid crystal display shown in FIG. 11A. FIG. 11C is a side view of the liquid crystal display shown in FIG. 11A.

Referring to FIGS. 11A to 11C, the liquid crystal display 500 includes the display area DA on which the image is displayed, the display area DA having a curved shape. Accordingly, the liquid crystal display 500 may display images having an improved three-dimensional effect using the display area DA having the curved shape, thereby providing an immersive viewing experience to a user.

In some embodiments, the liquid crystal display 500 includes the display substrate 100, the opposite substrate 300, and the liquid crystal layer. The opposite substrate 300 is coupled to the display substrate 100 facing the display substrate 100, and the liquid crystal layer is interposed between the display substrate 100 and the opposite substrate 300.

The liquid crystal display 500 may further include other components in addition to the display substrate 100 and the opposite substrate 300.

The liquid crystal display 500 is curved along the first direction D1 in a plane surface. Accordingly, a portion or all of the display substrate 100 has a curved shape along the first direction D1 (e.g. the display area DA has the curved shape along the first direction D1). In addition, the opposite substrate 300 has a curved shape corresponding to that of the display substrate 100.

As shown in FIG. 11C, when a first point P1 is defined at a curved portion of the display substrate 100 on the side surface of the display substrate 100, a normal line 10 crossing the first point P1 crosses a second point P2 of the opposite substrate 300. In addition, a gaze line 15, which is substantially parallel to a user's viewing direction, is defined at the first point P1 and the gaze line 15 crosses a third point P3 of the opposite substrate 300. In this case, since the display substrate 100 and the opposite substrate 300 have a curved shape, the second point P2 may be different from the third point P3 in the opposite substrate 300.

A distance d1 between the second point P2 and the third point P3 may vary depending on a curvature of the liquid crystal display 500. As the curvature of the liquid crystal display 500 increases, the distance d1 between the second point P2 and the third point P3 also increases.

As described above, a phenomenon whereby the distance d1 arises between the second point P2 and the third point P3 is referred to as a misalignment between the display substrate 100 and the opposite substrate 300 due to the curvature. Next, a structure of the liquid crystal display 500, which prevents a display quality of the image displayed in the display area DA of the liquid crystal display from deteriorating due to the misalignment, will be described.

Figure 12:
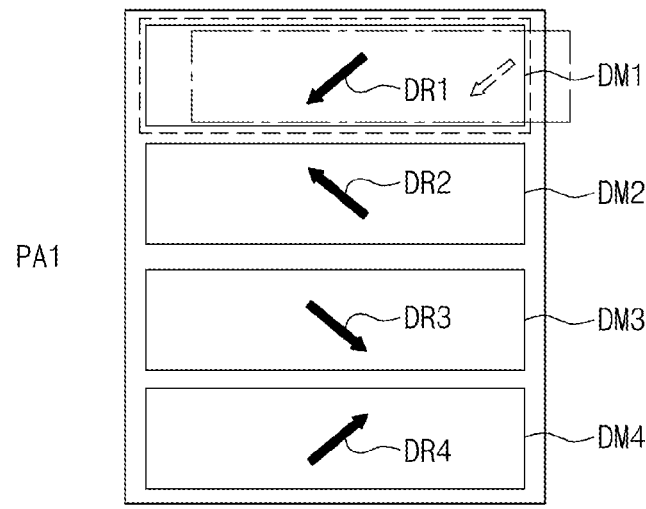
FIG. 12 is a view of the domains and liquid crystal alignment directions as defined in a pixel area.
Figure 12:
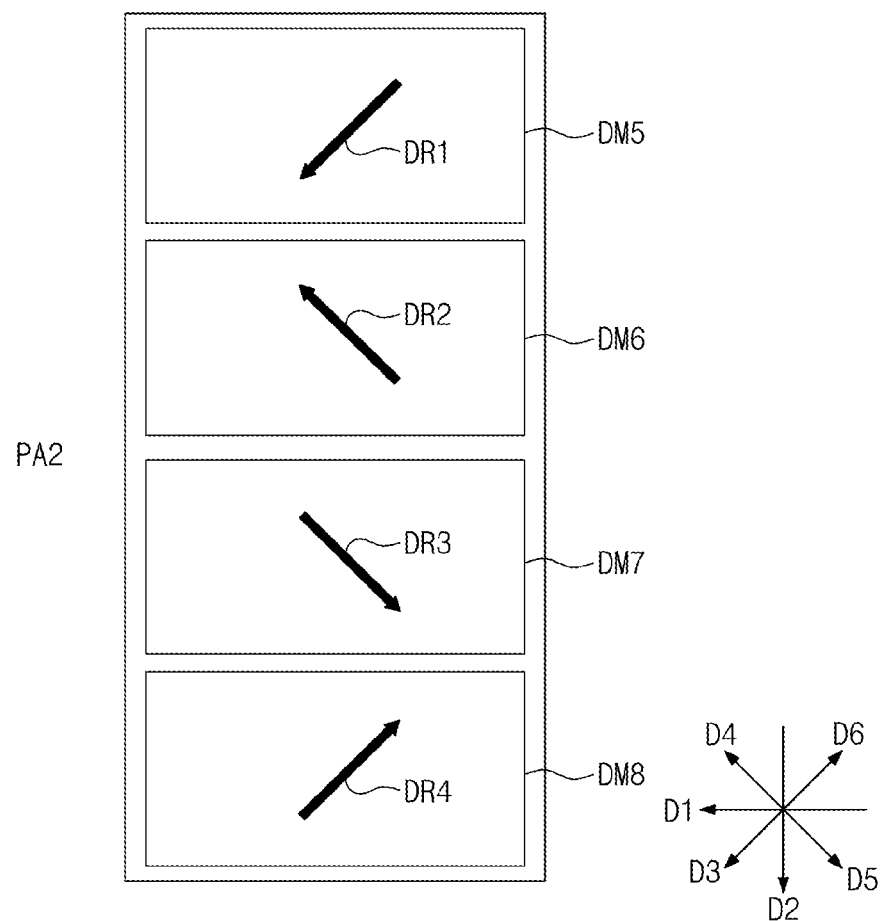

FIG. 12 is a view of the domains and liquid crystal alignment directions as defined in a pixel area.

Referring to FIGS. 1 and 12, the first sub-pixel electrode PE1 includes a first horizontal trunk portion HS1, a second horizontal trunk portion HS2, a first vertical trunk portion VS1, a second vertical trunk portion VS2, and first, second, third, and fourth branch portions B1, B2, B3, and B4.

Each of the first and second vertical trunk portions VS1 and VS2 extends in a second direction D2 crossing the first direction D1 where the liquid crystal display 500 is curved. In other words, the second direction D2 may be substantially perpendicular to the first direction D1 when viewed from a plan view.

The first horizontal trunk portion HS1 extends in the first direction D1, and branches from a center portion of the first vertical trunk portion VS1. Accordingly, the first vertical trunk portion VS1 is coupled to the first horizontal trunk portion HS1 and has a T shape rotated at about 90 degrees in a counter-clockwise direction.

A portion of the first branch portions B1 branches from the first horizontal trunk portion HS1, and the other portion of the first branch portions B1 branches from the first vertical trunk portion VS1. In addition, each of the first branch portions B1 extends in a third direction D3 inclined with respect to the first and second directions D1 and D2 when viewed from a plan view, and the first branch portions B1 are spaced apart from each other.

A portion of the second branch portions B2 branches from the first horizontal trunk portion HS1, and the other portion of the second branch portions B2 branches from the first vertical trunk portion VS1. In addition, each of the second branch portions B2 extends in a fourth direction D4 inclined with respect to the first and second directions D1 and D2 when viewed from a plan view, and the second branch portions B2 are spaced apart from each other.

When viewed from a plan view, the fourth direction D4 may cross the third direction D3. For instance, the third and fourth directions D3 and D4 may be substantially perpendicular to each other when viewed from a plan view, and each of the third and fourth directions D3 and D4 may form an angle of about 45 degrees with the first direction D1 or the second direction D2.

The first branch portions B1 have a shape symmetrical to that of the second branch portions B2 with respect to the first horizontal trunk portion HS1, and the first horizontal trunk portion HS1 is disposed between first and second domains DM1 and DM2.

The second horizontal trunk portion HS2 extends in the first direction D1 and branches from a center portion of the second vertical trunk portion VS2. Accordingly, the second vertical trunk portion VS2 is coupled to the second horizontal trunk portion HS2 and has a T shape rotated at about 90 degrees in a clockwise direction.

A portion of the third branch portions B3 branches from the second horizontal trunk portion HS2, and the other portion of the third branch portions B3 branches from the second vertical trunk portion VS2. In addition, each of the third branch portions B3 extends in a fifth direction D5 inclined with respect to the first and second directions D1 and D2 when viewed from a plan view, and the third branch portions B3 are spaced apart from each other.

A portion of the fourth branch portions B4 branches from the second horizontal trunk portion HS2, and the other portion of the fourth branch portions B4 branches from the second vertical trunk portion VS2. In addition, each of the fourth branch portions B4 extends in a sixth direction D6 inclined with respect to the first and second directions D1 and D2 when viewed from a plan view, and the fourth branch portions B4 are spaced apart from each other.

When viewed from a plan view, the sixth direction D6 may cross the fifth direction D5. For instance, the fifth and sixth directions D5 and D6 may be substantially perpendicular to each other when viewed from a plan view, and each of the fifth and sixth directions D5 and D6 may form an angle of about 45 degrees with the first direction D1 or the second direction D2.

The third branch portions B3 have a shape symmetrical to that of the fourth branch portions B4 with respect to the second horizontal trunk portion HS2, and the second horizontal trunk portion HS2 is disposed between third and fourth domains DM3 and DM4. The second sub-pixel electrode PE2 may have a size different from a size of the first sub-pixel electrode PE1, but the second sub-pixel electrode PE2 may have a shape similar to a shape of the first sub-pixel electrode PE1.

The second sub-pixel electrode PE2 includes a third horizontal trunk portion HS3, a fourth horizontal trunk portion HS4, a third vertical trunk portion VS3, a fourth vertical trunk portion VS4, and fifth, sixth, seventh, and eighth branch portions B5, B6, B7, and B8.

The third horizontal trunk portion HS3 branches from the third vertical trunk portion VS3 and extends in the first direction D1, and the fourth horizontal trunk portion HS4 branches from the fourth vertical trunk portion VS4 and extends in the first direction D1. The third horizontal trunk portion HS3 branches from a center portion of the third vertical trunk portion VS3, and the fourth horizontal trunk portion HS4 branches from a center portion of the fourth vertical trunk portion VS4.

A portion of the fifth branch portions B5 branches from the third horizontal trunk portion HS3, and the other portion of the fifth branch portions B5 branches from the third vertical trunk portion VS3. Each of the fifth branch portions B5 extends in the third direction D3 when viewed from a plan view, and the fifth branch portions B5 are spaced apart from each other.

A portion of the sixth branch portions B6 branches from the third horizontal trunk portion HS3, and the other portion of the sixth branch portions B6 branches from the third vertical trunk portion VS3. Each of the sixth branch portions B6 extends in the fourth direction D4 when viewed from a plan view, and the sixth branch portions B6 are spaced apart from each other.

A portion of the seventh branch portions B7 branches from the fourth horizontal trunk portion HS4, and the other portion of the seventh branch portions B7 branches from the fourth vertical trunk portion VS4. Each of the seventh branch portions B7 extends in the fifth direction D5 when viewed from a plan view, and the seventh branch portions B7 are spaced apart from each other.

A portion of the eighth branch portions B8 branches from the fourth horizontal trunk portion HS4, and the other portion of the eighth branch portions B8 branches from the fourth vertical trunk portion VS4. Each of the eighth branch portions B8 extends in the sixth direction D6 when viewed from a plan view, and the eighth branch portions B8 are spaced apart from each other.

As shown in FIG. 12, first to fourth domains DM1 to DM4 are defined in the first sub-pixel area PA1, and fifth to eighth domains DM5 to DM8 are defined in the second sub-pixel area PA2.

When the first to eighth domains DM1 to DM8 are defined in the first and second sub-pixel areas PA1 and PA2, the first sub-pixel electrode PE1 further includes a first domain connection part LP1 and the second sub-pixel electrode PE2 further includes a second domain connection part LP2.

The first domain connection part LP1 is disposed between the second domain DM2 and the third domain DM3 so as to connect the second and third branch portions B2 and B3. The second domain connection part LP2 is disposed between the sixth domain DM6 and the seventh domain DM7 so as to connect the sixth and seventh branch portions B6 and B7. The first domain connection part LP1 is disposed at a center of a boundary area between the second and third domains DM2 and DM3, and the second domain connection part LP2 is disposed at a center of a boundary area between the sixth and seventh domains DM6 and DM7.

The area in which the liquid crystal molecules are aligned by the first branch portions B1 is referred to as the first domain DM1. A first liquid crystal alignment direction DR1 in the first domain DM1 is defined as the third direction D3. The area in which the liquid crystal molecules are aligned by the second branch portions B2 is referred to as the second domain DM2. A second liquid crystal alignment direction DR2 in the second domain DM2 is defined as the fourth direction D4.

A third liquid crystal alignment direction DR3 in the third domain DM3 is defined as the fifth direction D5, and a fourth liquid crystal alignment direction DR4 in the fourth domain DM4 is defined as the sixth direction D6.

The first to fourth domains DM1 to DM4 are formed sequentially arranged in the second direction D2 in the first sub-pixel area PA1, with different liquid crystal alignment directions in the first to fourth domains DM1 to DM4. Accordingly, a viewing range about the first sub-pixel area PA1 may be expanded.

In addition, the fifth to eighth domains DM5 to DM8 are formed sequentially arranged in the second direction D2 in the second sub-pixel area PA2, with different liquid crystal alignment directions in the fifth to eighth domains DM5 to DM8. Accordingly, a viewing range about the second sub-pixel area PA2 may be expanded.

As previously mentioned, the overlapping of the domains is caused by the misalignment of the liquid crystal display 500 when curved in the first direction D1. The first to eighth domains DM1 to DM8 are arranged in one pixel along the second direction D2, which prevents domains having different liquid crystal alignment directions from overlapping with each other. As a result, defects in texture caused by liquid crystal misalignment may be prevented.

As described above, when the shielding electrode SHE, the spacer CS, and the light blocking layer BM are disposed on the display substrate 100, the light blocking area BA may be prevented from moving to the pixel area PA even though the misalignment occurs between the display substrate 100 and the opposite substrate 300. Thus, a vertical dark line may be prevented from occurring in the pixel area PA in a direction (i.e., the second direction D2) substantially vertical to the first direction D1 in which the liquid crystal display 500 is curved.

Figure 13:
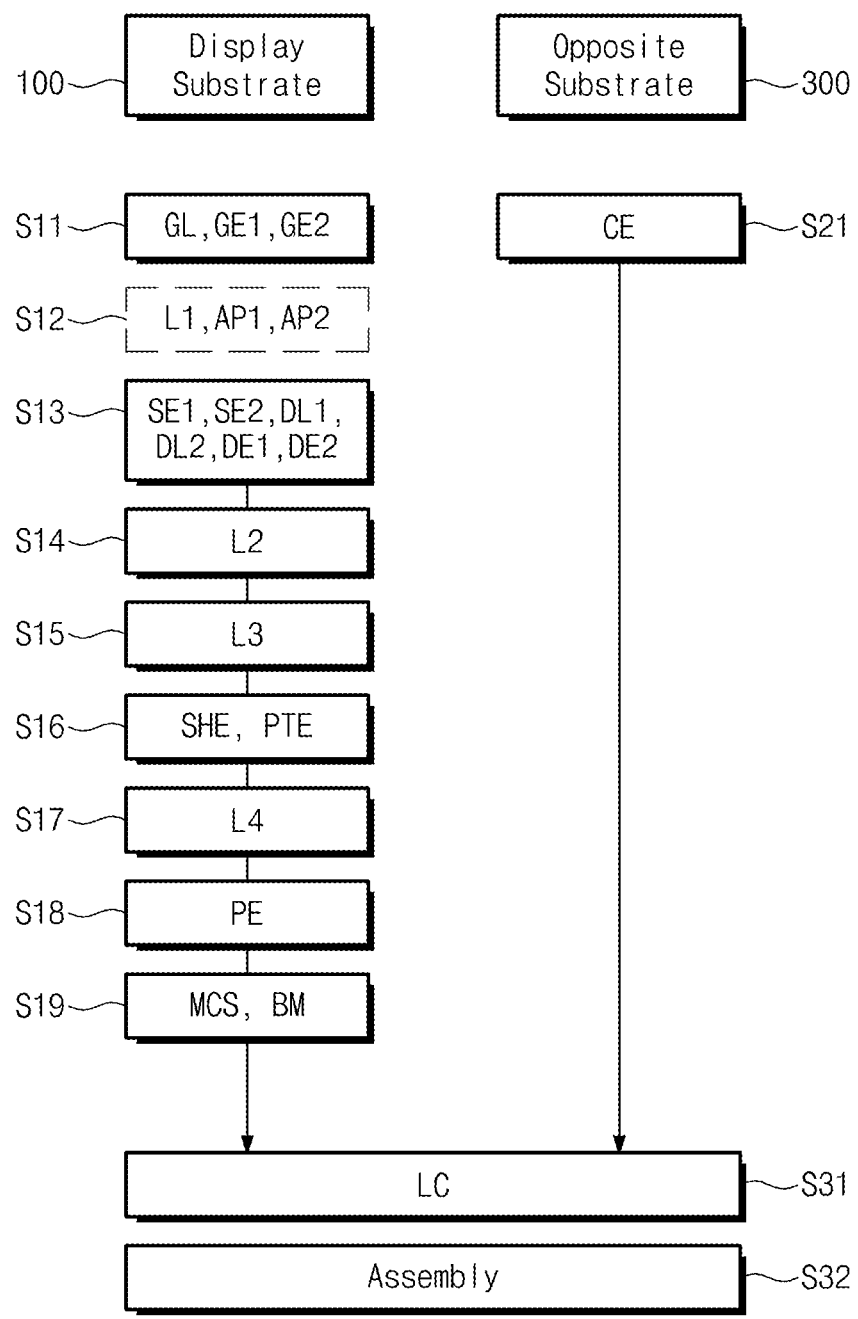
FIG. 13 is a flowchart showing a manufacturing process of a liquid crystal display according to an exemplary embodiment of the inventive concept.

FIG. 13 is a flowchart showing a manufacturing process of a liquid crystal display according to an exemplary embodiment of the inventive concept.

Referring to FIG. 13, the display substrate 100 is manufactured with reference to steps S11 through S19, and the opposite substrate 300 is manufactured as with reference to step S21.

To manufacture the display substrate 100, the gate line GL and the first and second gate electrodes GE1 and GE2 are formed on the first base substrate S1 (S11).

The first insulating layer L1 is formed on the first base substrate S1 covering the first gate line GL and the first and second gate electrodes GE1 and GE2, and the first and second active patterns AP1 and AP2 are formed on the first insulating layer L1 (S12). The first and second active patterns AP1 and AP2 are formed respectively facing the first and second gate electrodes GE1 and GE2.

The first and second data lines DL1 and DL2 are formed on the first insulating layer L1, the first source electrode SE1 and the first drain electrode DE1 are formed on the first active pattern AP1, and the second source electrode SE2 and the second drain electrode DE2 are formed on the second active pattern AP2 (S13). Accordingly, the first and second thin film transistors TR1 and TR2 are formed on the display substrate 100.

The second insulating layer L2 is formed on the display substrate 100 covering the first and second thin film transistors TR1 and TR2 (S14). The third insulating layer L3 is formed on the second insulating layer L2 (S15). The third insulating layer L3 may include the red, green, and blue color pixels R, G, and B.

The shielding electrode SHE and the protruding electrode PTE are formed on the third insulating layer L3 (S16). The shielding electrode SHE and the protruding electrode PTE are covered by the fourth insulating layer L4 (S17). The pixel electrode PE is formed on the fourth insulating layer L4 (S18). The pixel electrode PE may include the first and second sub-pixel electrodes PE1 and PE2.

The main spacer MCS and the light blocking layer BM are formed on the pixel electrode PE (S19). The main spacer MCS and the light blocking layer BM may be simultaneously formed through the same process.

Although not shown in the figures, a process of forming the first alignment layer may be further performed after forming the main spacer MCS and the light blocking layer BM.

To manufacture the opposite substrate 300, the common electrode CE is formed on the second base substrate S2 (S21). Although not shown in the figures, a second alignment layer may be formed on the common electrode CE.

After the display substrate 100 and the opposite substrate 300 are manufactured, the liquid crystal layer LC is formed between the display substrate 100 and the opposite substrate 300 (S31). Then, the display substrate 100 and the opposite substrate 300 are assembled to form the liquid crystal display 500 (S32).

Although exemplary embodiments of the inventive concept have been described, it is understood that the inventive concept is not limited to the described embodiments but may include various changes and modifications to the embodiments as made by one skilled in the art within the spirit and scope of the present disclosure.

What is claimed is:

1. A liquid crystal display comprising:
a display substrate;
an opposite substrate coupled to and facing the display substrate; and
a liquid crystal layer disposed between the display substrate and the opposite substrate, wherein the display substrate comprises:
a gate line extending in a first direction;
a data line extending in a second direction crossing the first direction;
a shielding electrode disposed along the data line covering the data line;
a protruding electrode extending from the shielding electrode partially covering the gate line;
a pixel electrode electrically insulated from the shielding electrode and configured to receive a signal from the gate and data lines, and
a light blocking layer comprising a light blocking material,
wherein the display substrate comprises a plurality of pixel areas, and each pixel area comprises a light blocking area in which at least one thin film transistor is disposed,
wherein the light blocking layer is disposed in the light blocking area of the display substrate,
wherein the shielding electrode and the protruding electrode are disposed on a lower insulating layer and covered by an upper insulating layer,
wherein the pixel electrode and the light blocking layer are disposed on the upper insulating layer, and
wherein the light blocking layer is disposed between two adjacent shielding electrodes in each one of the plurality of pixel areas, and the protruding electrode extends to the light blocking area.

2. The liquid crystal display of claim 1, wherein the light blocking layer is spaced apart from the protruding electrode.

3. The liquid crystal display of claim 1, wherein the light blocking layer overlaps with the protruding electrode.

4. The liquid crystal display of claim 1, further comprising: a main spacer disposed on the display substrate and making contact with the opposite substrate to maintain a cell gap between the display substrate and the opposite substrate, wherein the main spacer comprises a light blocking material.

5. The liquid crystal display of claim 4, wherein the main spacer protrudes from the light blocking layer to the opposite substrate.

6. The liquid crystal display of claim 4, wherein the main spacer is disposed corresponding to the light blocking area in which the thin film transistor is disposed.

7. The liquid crystal display of claim 4, wherein the main spacer is provided one every three pixels or one every nine pixels.

8. The liquid crystal display of claim 7, wherein the display substrate comprises red, green, and blue color pixels respectively corresponding to the pixel areas, and the main spacer is disposed on the blue color pixel.

9. The liquid crystal display of claim 4, further comprising: a sub-spacer disposed on the display substrate and spaced apart from the opposite substrate, the sub-spacer protruding from the light blocking layer, wherein the sub-spacer comprises a light blocking material.

10. The liquid crystal display of claim 9, wherein a difference in height between the main spacer and the sub-spacer ranges from about 0.25 micrometers to about 0.8 micrometers.

11. The liquid crystal display of claim 1, further comprising:
a sub-spacer disposed on the display substrate and spaced apart from the opposite substrate; and
a main spacer disposed on the display substrate and making contact with the opposite substrate to maintain a cell gap between the display substrate and the opposite substrate, wherein the main spacer and the sub-spacer comprise a light blocking material.

12. The liquid crystal display of claim 11, wherein a difference in height between the main spacer and the sub-spacer ranges from about 0.25 micrometers to about 0.8 micrometers.

13. The liquid crystal display of claim 11, wherein a ratio of a total contact area between the main spacer and the display substrate to the display area is about 1% or less.

14. The liquid crystal display of claim 13, wherein the sub-spacer has a rectangular shape, an oval shape, or a lozenge shape when viewed from a plan view, and the main spacer has a circular shape, a rectangular shape, or an oval shape when viewed from a plan view.

15. The liquid crystal display of claim 1, wherein each pixel area comprises a first sub-pixel area and a second sub-pixel area, the display substrate comprises a first sub-pixel electrode disposed in the first sub-pixel area and a second sub-pixel electrode disposed in the second sub-pixel area, and the thin film transistor comprises a first thin film transistor connected to the first sub-pixel electrode and a second thin film transistor connected to the second sub-pixel electrode.

16. The liquid crystal display of claim 15, wherein the data line comprises:
a first data line electrically connected to the first sub-pixel electrode to apply a first data signal to the first sub-pixel electrode;
a second data line electrically connected to the second sub-pixel electrode to apply a second data signal to the second sub-pixel electrode, wherein the second data signal is different from the first data signal, and the shielding electrode extends along the first and second data lines to receive a black gray scale voltage.

17. The liquid crystal display of claim 16, wherein the protruding electrode extends in an area between the first and second sub-pixel areas.

* * * * *